US011533296B2

(12) United States Patent
Adam et al.

(10) Patent No.: US 11,533,296 B2
(45) Date of Patent: *Dec. 20, 2022

(54) TESTING AND REMEDIATING COMPLIANCE CONTROLS

(71) Applicant: Kyndryl, Inc., New York, NY (US)

(72) Inventors: Constantin Mircea Adam, Norwalk, CT (US); Richard Jay Cohen, Austin, TX (US); Robert Filepp, Westport, CT (US); Milton H. Hernandez, Tenafly, NJ (US); Brian Peterson, Ridgefield, CT (US); Maja Vukovic, New York, NY (US); Sai Zeng, Yorktown Heights, NY (US); Guan Qun Zhang, Beijing (CN); Bhavna Agrawal, Armonk, NY (US)

(73) Assignee: KYNDRYL, INC., New York, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/694,355

(22) Filed: Sep. 1, 2017

(65) Prior Publication Data

US 2019/0075081 A1 Mar. 7, 2019

(51) Int. Cl.
*H04L 9/40* (2022.01)
*G06F 21/57* (2013.01)

(52) U.S. Cl.
CPC ........ *H04L 63/0263* (2013.01); *G06F 21/577* (2013.01); *H04L 63/20* (2013.01)

(58) Field of Classification Search
CPC ..... H04L 63/0263; H04L 63/02; H04L 63/20; G06F 21/577
See application file for complete search history.

(56) References Cited

U.S. PATENT DOCUMENTS

| 7,249,187 B2 | 7/2007 | Sobel et al. |
| 8,494,977 B1* | 7/2013 | Yehuda ............... G06Q 10/00 706/11 |
| 8,631,033 B2* | 1/2014 | Anderson ........... G06F 21/6218 707/770 |
| 9,129,108 B2 | 9/2015 | Drissi et al. |
| 10,116,614 B1* | 10/2018 | Rihn ...................... H04L 51/32 |

(Continued)

FOREIGN PATENT DOCUMENTS

WO 2016109608 A1 7/2016

OTHER PUBLICATIONS

Non-Final Office Action received for U.S. Appl. No. 15/841,915 dated Jun. 28, 2019, 22 pages.

(Continued)

*Primary Examiner* — Farid Homayounmehr
*Assistant Examiner* — Suman Debnath
(74) *Attorney, Agent, or Firm* — Amin, Turocy & Watson, LLP

(57) ABSTRACT

Users of an endpoint remediation system can be assigned to different roles, from which they can request exceptions, approve exceptions, and/or enable remediation on endpoint devices. The compliance scanning and enforcing process can be automated, while allowing entities to request and/or approve certain exceptions. Therefore, security compliance for customers can be actively managed to provide visibility to the endpoint device compliance state at any time.

19 Claims, 16 Drawing Sheets

(56) References Cited

U.S. PATENT DOCUMENTS

| | | | |
|---|---|---|---|
| 10,122,577 B1* | 11/2018 | Rykowski | G06F 16/24578 |
| 2007/0271306 A1* | 11/2007 | Brown | G06F 16/2477 |
| 2008/0134176 A1 | 6/2008 | Fitzgerald et al. | |
| 2012/0011077 A1 | 1/2012 | Bhagat | |
| 2012/0084412 A1* | 4/2012 | Burns | H04L 41/0893 |
| | | | 709/221 |
| 2013/0091536 A1* | 4/2013 | Manjunath | H04L 63/10 |
| | | | 726/1 |
| 2017/0154189 A1* | 6/2017 | Betzler | G06F 9/45558 |
| 2017/0269954 A1* | 9/2017 | Hardy | G06F 21/577 |
| 2018/0025011 A1* | 1/2018 | Aksionkin | H04L 63/20 |
| | | | 707/692 |
| 2019/0012458 A1* | 1/2019 | Fausak | G06F 21/565 |

OTHER PUBLICATIONS

Final Office Action received for U.S. Appl. No. 15/841,915 dated Jan. 9, 2020, 18 pages.
Office Action received for U.S. Appl. No. 15/841,915 dated Jun. 15, 2020, 26 pages.
Office Action received for U.S. Appl. No. 15/841,915 dated Dec. 17, 2020, 36 pages.
Non-Final Office Action received for U.S. Appl. No. 15/841,915 dated Sep. 3, 2021, 32 pages.
Final Office Action received for U.S. Appl. No. 15/841,915 dated Apr. 13, 2022, 53 pages.
List of IBM Patents or Applications to be treated as related.

* cited by examiner

TESTING AND REMEDIATING COMPLIANCE CONTROLS

BACKGROUND

The subject disclosure relates to testing endpoint devices for violations, and more specifically, to remediating the endpoint devices based on the violations.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate testing and remediating compliance controls are described.

According to embodiment, a system can comprise a memory that stores computer executable components, and a processor that executes the computer executable components stored in the memory. The computer executable components of the system can comprise an execution component that, based on compliance data, received from an entity, associated with a compliance rule of an endpoint device, scans the endpoint device for an indication of a violation of the compliance rule. In response to the indication of the violation, the execution component can facilitate execution of a script associated with the violation at the endpoint device, resulting in a remediation associated with the violation at the endpoint device.

According to another embodiment, a computer program product facilitates compliance control remediation, the computer program product comprising a computer readable storage medium having program instructions embodied therewith. The program instructions can be executable by a processor and the processor can scan the endpoint device for an indication of a violation of the compliance rule based on compliance data, received from an entity, associated with a compliance rule of an endpoint device. The program instructions can also be executable to execute, by the processor, a script associated with the violation at the endpoint device, resulting in a remediation associated with the violation at the endpoint device in response to the indication of the violation.

According to yet another embodiment, a computer-implemented method is provided. The computer-implemented method can comprise scanning, by a device operatively coupled to a processor, the endpoint device for an indication of a violation of the compliance rule based on compliance data, received from an entity, associated with a compliance rule of an endpoint device. The computer-implemented method can also comprise, in response to the indication of the violation, executing, by the device, a script associated with the violation at the endpoint device, resulting in a remediation associated with the violation at the endpoint device.

According to yet another embodiment, a system can comprise a memory that stores computer executable components, and a processor that executes the computer executable components stored in the memory. The computer executable components of the system can comprise an execution component that, based on compliance data, received from an entity, associated with a compliance rule of an endpoint device, scans the endpoint device for an indication of a violation of the compliance rule. In response to the indication of the violation, the execution component can facilitate execution of a script associated with the violation at the endpoint device, resulting in a remediation associated with the violation at the endpoint device. The computer executable components of the system can also comprise a process manager component that, receives an exception request from the endpoint device, wherein the exception request is related to an exception to the compliance rule.

According to yet another embodiment, a computer program product facilitates compliance control remediation, the computer program product comprising a computer readable storage medium having program instructions embodied therewith. The program instructions can be executable by a processor and the processor can scan the endpoint device for an indication of a violation of the compliance rule based on compliance data, received from an entity, associated with a compliance rule of an endpoint device. The program instructions can also be executable to facilitate, by the processor, execution of a script associated with the violation at the endpoint device in response to the indication of the violation, resulting in a remediation associated with the violation at the endpoint device. The program instructions are further executable to receive, by the processor, an exception request from the endpoint device, wherein the exception request is related to an exception to the compliance rule.

In some embodiments, one or more of the above elements described in connection with the systems, computer-implemented methods and/or computer program programs can be embodied in different forms such as a computer-implemented method, a computer program product, or a system.

DETAILED DESCRIPTION

Figure 1:
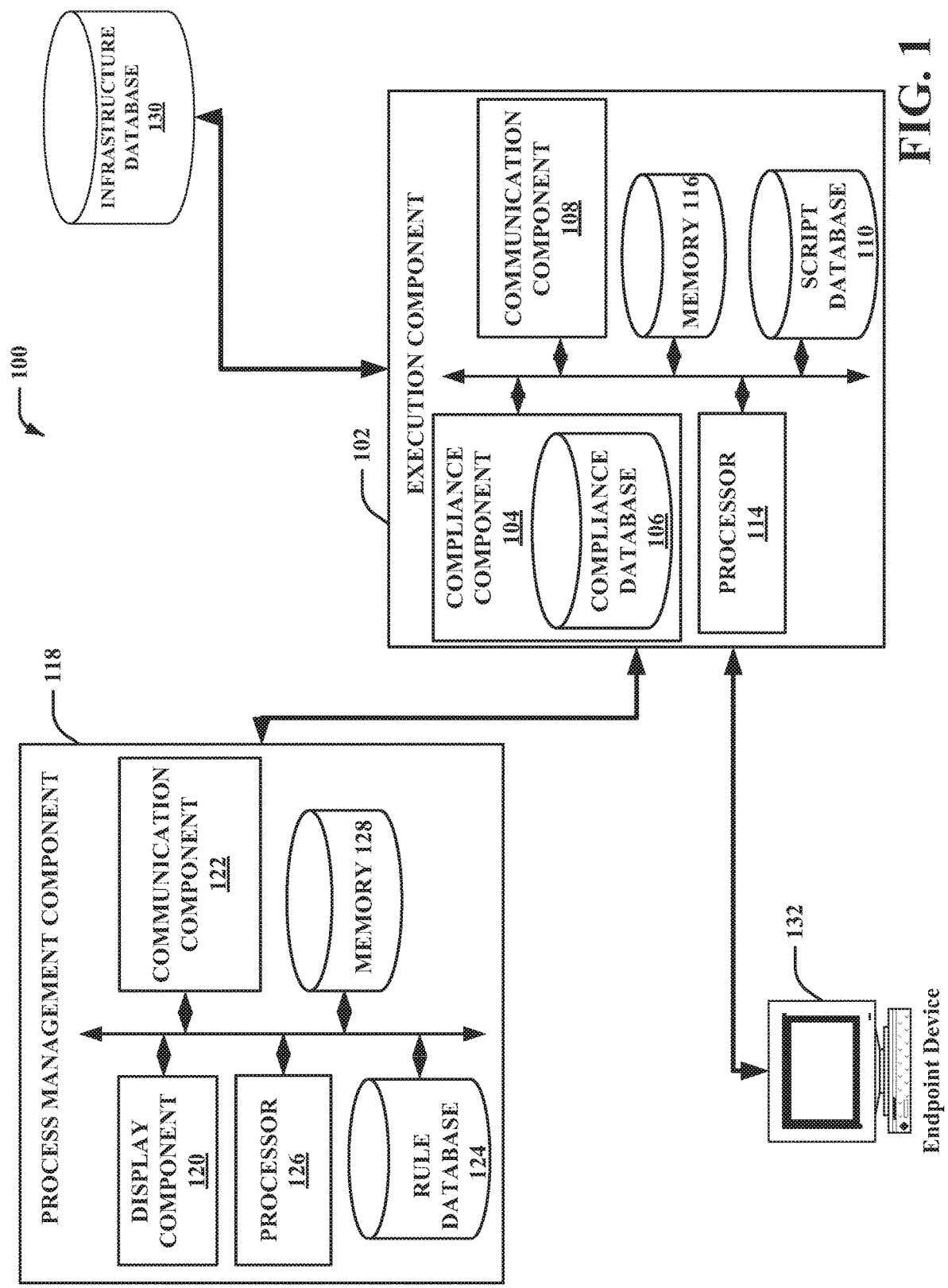
FIG. 1 illustrates a block diagram of an example, non-limiting system that facilitates remediation of non-compliant endpoint devices in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments described herein can facilitate endpoint device (e.g., virtual machine, server, etc.) compliance with a specific regulation. Providers of Internet protocol (IP) services and server management can keep servers in compliance. For example, one or more embodiments described herein can provide security-based attributes of endpoint devices that include security requirements including, but not limited to: passwords, various configurations of operating systems, logins, etc. Compliance services can create a framework from the aforementioned outputs in a uniform structure that can be stored in a database and provide a uniform interface for customizations based on security rules. However, there can also be cases when exceptions can be requested and approved for specific endpoint devices. In addition to enforcing compliance, one or more embodiments described herein can also allow exception requests and implement the exceptions once they are approved. Exceptions can be provided to a particular endpoint device based on what an entity dictates.

In some instances, one or more embodiments described herein can perform a compliance check by automatically scanning for compliance violations and/or remediating the compliance violations on one or more endpoint devices. Based on the scanning, a compliance report comprising endpoint device violations can be provided to an entity, allowing the entity to define exceptions to the violations.

Furthermore, one or more embodiments described herein can comprise a graphical user interface (GUI) facilitating viewing the results of the compliance checks and generating statistics about the compliance checks. The results of compliance checks can be presented by listing each item of a regulation and whether the endpoint device is compliant with that item. If the endpoint device is not compliant, the system can display data regarding which parameter is non-compliant, a value associated with the non-compliant parameter, and what value the parameter should be set to for the endpoint device to become compliant. For each non-compliant parameter, a command can be generated for returning each non-compliant parameter back to compliance.

The GUI of the one or more embodiments described herein can allow entities associated with or that operate or received information from the system to be assigned different roles, from which they can request exceptions, approve exceptions, and/or enable remediation of the endpoint devices. The compliance scanning and enforcing process can be automated, while letting users request and approve certain exceptions. Therefore, security compliance for customers can be actively managed to provide visibility to a compliance state of the customers' endpoint device at any time.

Running compliance operations in a completely controlled environment allows changes in policy, or any exceptions, to flow through a rigorously defined change management process. Data stored in a compliance console and in the system log can be used to build a knowledge base and provide insights into the operation of the system and the compliance and operational risk of each system component.

One or more embodiments described herein can determine if a compliance violation has occurred at an endpoint device. Based on the occurrence of the compliance violation, the system can execute a script to the endpoint device to bring the endpoint device back to conformance or accept an exception request from the endpoint device to allow an exception for the non-compliance.

One or more embodiments described herein include systems, computer-implemented methods, apparatus, and computer program products that facilitate remediation of endpoint devices based on flagged violations.

FIG. 1 illustrates a block diagram of an example, non-limiting system 100 that facilitates remediation of non-compliant endpoint devices in accordance with one or more embodiments described herein. In various embodiments, the system 100 can be associated with or included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

In one embodiment, the system 100 can facilitate remediation of non-compliant endpoint devices 132. For example, in one embodiment, the system 100 can comprise a process management component 118. The process management component can comprise sub-components including, but limited to, a display component 120, a communication component 122, a rule database 124, a memory 128, and/or a processor 126. It should be noted that the sub-components (e.g., the display component 120, the communication component 122, and the rule database 124), the processor 126, and the memory 128 can bi-directionally communicate with each other. Aspects of the processor 126 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the process management component 118. It should also be noted that in alternative embodiments other components including, but not limited to, the sub-components, the processor 126, and/or the memory 128, can be external to the process management component 118.

The process management component 118 can define polices, environments (e.g., production, test, development), and/or profiles associated with an endpoint device 132. For example, an entity can manipulate data received via the display component 120 (e.g., GUI) to define a policy for which the endpoint device 132 shall remain in compliance during a specific environment. In various embodiments, the entity can be a machine and/or can include software and/or hardware to cause the entity to perform one or more functions described herein. The entity can define policies, environments, and/or profiles based on previously stored compliance data (e.g., at the compliance database 106) and compliance updates associated with the endpoint device 132. The compliance updates can comprise data associated with whether the endpoint device 132 is or is not in compliance with previous rules. In some embodiments, the entity can be a human.

The entity can define and/or provide information indicative of an environment for compliance profiles at the profile level or the node level. A compliance profile is a defined set of behaviors (e.g., compliance scripts) and attribute values that can be inputs to the scripts. A node, is an endpoint device 132 that can be the subject of the compliance. The defined policy can be transmitted to the endpoint device 132, via the communication component 122, either directly (not shown) or via an execution component 102 (as shown in FIG. 1). Additionally, the defined policies can be stored in the rule database 124 for access at a later time. The process management component 118 can also onboard and/or remove endpoint devices to/from the system 100. For example, the endpoint device 132 (already added to the system 100) can be removed from the system 100, by the process management component 118, for non-compliance with a policy developed by the process management component 118. In some embodiments, if the endpoint device 132 is removed from the system 100, the endpoint device 132 can be disconnected from the execution component 102. Thus, in this embodiment, the endpoint device 132 is removed from the system 100 and is no longer able to communicate with the execution component 102.

The process management component 118 can also process exceptions to previously generated policies. For example, before, during, or after the endpoint device 132 has experienced a security failure resulting in a violation indicating a non-compliance with a policy generated by the process management component 118, a non-compliance exception request can be sent to the process management component 118 (e.g., from the execution component 102), via the communication component 122, requesting an exception to the policy. In various embodiments, the rule database 124 can be accessed to determine if a previous exception request has been granted for the policy, if the endpoint device 132 has any other pending or approved exception requests, and/or if another endpoint device has been granted an exception request for the policy. The process management component 118 or an entity that uses the process management component 118 (or receives information from the process management component 118) can make a determination to grant the exception request or to not grant the exception request and can communicate (e.g., via the communication component 122) such determination to the endpoint device 132 directly or via the execution component 102.

The execution component 102 can comprise sub-components including, but limited to, a compliance component 104, a communication component 108, a script database 110, a memory 116, and/or a processor 114. It should be noted that the sub-components (e.g., the compliance component 104, the communication component 108, the script database 110), the processor 114, and the memory 116 can bi-directionally communicate with each other. Aspects of the processor 114 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by execution component 102. It should also be noted that in alternative embodiments other components including, but not limited to, the sub-components, the processor 114, and/or the memory 116, can be external to the process management component 118.

The execution component 102 can launch compliance checks at the endpoint device 132 based on policies generated at the process management component 118 as noted herein. For example, a policy violation can be assessed at the endpoint device 132 by executing a script associated with the policy at the endpoint device 132. In some embodiments, scripts can be invoked based on a determination of the specific application running on the endpoint device 132. Further, in some embodiments, a dynamic wrapper can ensure that only scripts that are required to be executed are run at the endpoint device. A determination of required scripts can be made based on an evaluation of a configuration of the endpoint device 132. One or more updates can be provided to the endpoint device 132. The one or more updates can be employed to upgrade the endpoint device 132.

After or during checking the compliance of an endpoint device 132, the system 100 can execute the wrapper to apply rules to the scripts. Consequently, in some embodiments, only compliance scripts that meet a defined criterion (e.g., those defined as essential, important, required) are run at the endpoint device 132 and therefore the system 100 can operate more efficiently in some embodiments.

In embodiments in which the endpoint device 132 is moved to a different location, the compliance scripts can be executed against a new endpoint device provided at the location of the previous endpoint device. However, the new compliance scripts for the new endpoint device can be updated to those compliance scripts that meet a defined criterion for that particular new endpoint device (e.g., those defined as essential, important, required based on the applications at the new endpoint device). Thus, the compliance scripts can be dynamically determined for each endpoint device (or, in some embodiments, one or more endpoint devices) and can be changed from time to time.

In some embodiments, the script can be used to determine the current state of the endpoint device 132 (e.g., test mode, maintenance mode, remediation mode, etc.) and/or initiate a state change for the endpoint device 132. The scripts can also comprise endpoint device configuration data, generated by a configuration component of the execution component 102 that can be employed to configure the endpoint device 132 to perform certain, defined functions. The execution component 102 can upload scripts to the script database 110, manage user accounts, orchestrate onboarding or removal of endpoint devices 132, and/or apply entity-defined overrides to the system 100 in various embodiments.

In various embodiments, the scripts can be generated at the execution component 102 or generated at the process management component 118 and transmitted to the execution component 102 via the communication components 122, 108. The communication component 108 can also be used to transmit or receive data (e.g., scripts, compliance data, output data, etc.) to/from the endpoint device 132. It should also be noted that although only one endpoint device 132 is shown in FIG. 1, multiple endpoint devices are possible in this or other embodiments described herein.

In some embodiments, the compliance component 104 can generate auditing and reporting capabilities to the system 100. For example, the endpoint device 132 can generate and/or format (e.g., into JavaScript object notation (JSON)) output data in response to execution of a script at the endpoint device 132. The formatted output data can then be sent to the compliance database 106 to be stored by the compliance component 104.

In some embodiments, the compliance component 104 can generate a report based on the stored compliance data, and the report can be stored at the compliance database 106 and/or transmitted to the process management component 118. In some embodiments, instead of taking a remediation action, the report can be analyzed to generate a new compliance rule via the process management component 118. The infrastructure database 130 can comprise data used for determining parameters for script execution and evaluation (e.g., a script wrapper). Script metadata from the infrastructure database 130 can be added to the script database 110 to further improve the scripts to be executed at the endpoint device 132. In some embodiments, the script metadata can enable the creation of a model-driven user interface (e.g., display component 204) for scripts at the execution component 102.

One or more components of the system 100 can employ hardware and/or software to solve problems that are highly technical in nature (e.g., non-compliance violation searches, non-compliance flagging, profile generation, determination and/or remediation of compliance concerns, etc.) that are not abstract and that cannot be performed as a set of mental acts by a human due to the processing capabilities needed to facilitate endpoint device remediation, for example. Further, some of the processes performed may be performed by a specialized computer for carrying out defined tasks related to memory operations. For example, a specialized computer can be employed to carry out tasks related to endpoint device remediation or the like.

Figure 2:
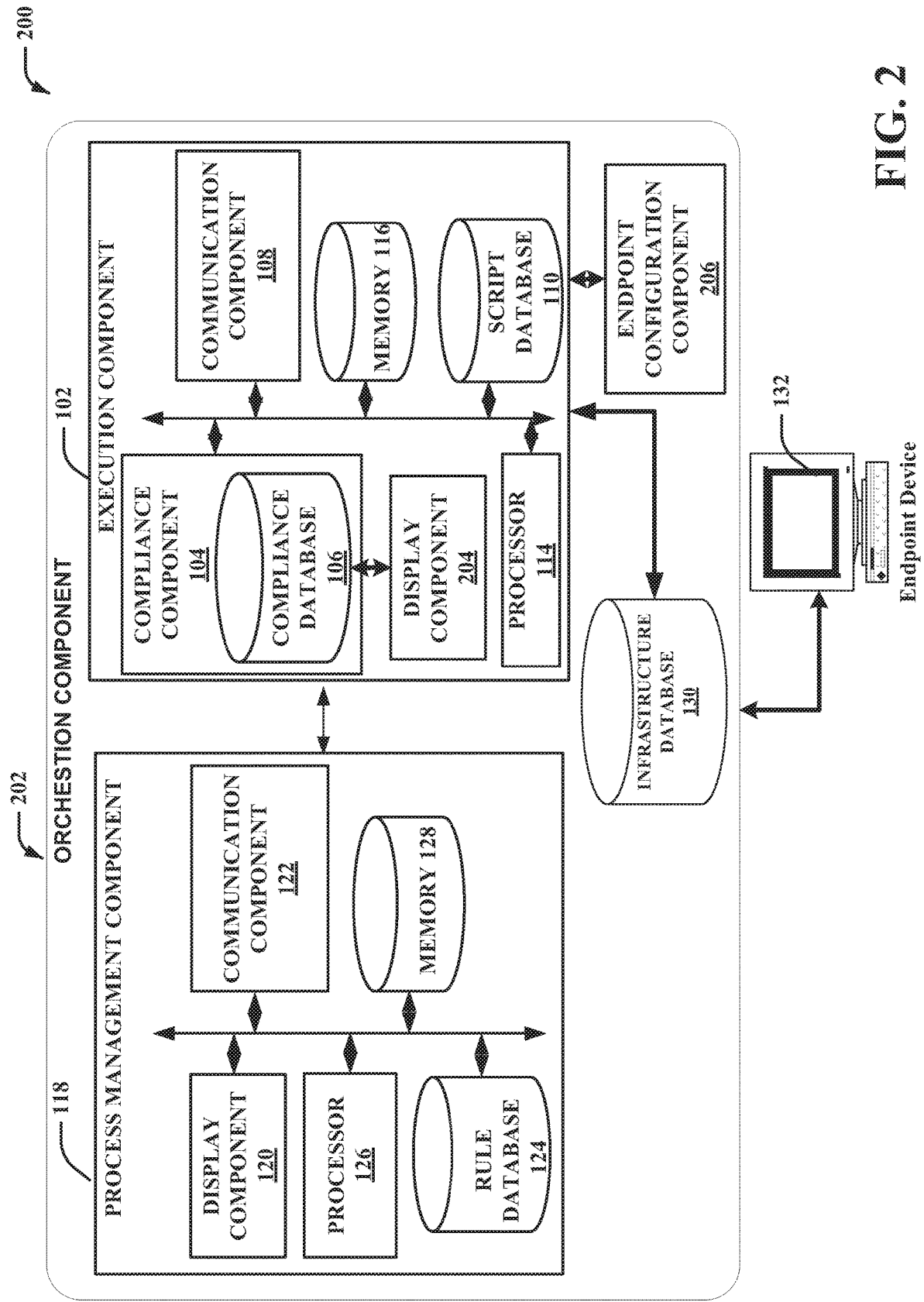
FIG. 2 illustrates a block diagram of an example, non-limiting orchestration component in accordance with one or more embodiments described herein.

FIG. 2 illustrates a block diagram of an example, non-limiting orchestration component of system 200 in accordance with one or more embodiments described herein. Repetitive description of like elements employed in other embodiments described herein is omitted for sake of brevity.

Figure 3:
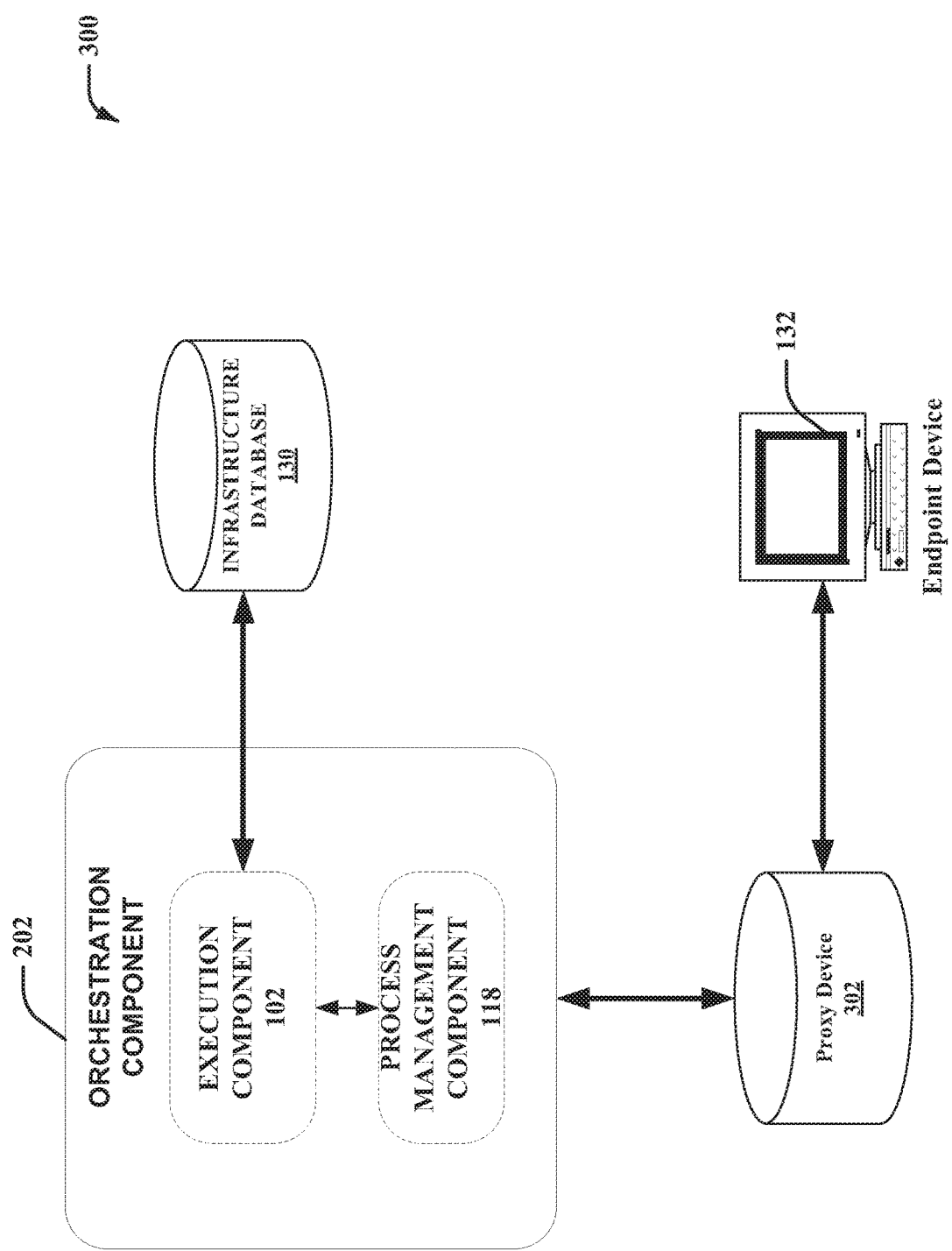
FIG. 3 illustrates yet another block diagram of an example, non-limiting system that facilitates remediation of non-compliant endpoint devices in accordance with one or more embodiments described herein.

As shown in FIG. 2, an orchestration component 202 can comprise the process management component 118, the execution component 102, and the infrastructure database 130 as a standalone system in an alternative embodiment to system 100. However, in some cases (as shown in FIG. 3), in which there is no direct access to the endpoint device 132, the orchestration component 202 can access the endpoint device through a proxy (e.g., broker). The orchestration component 202 can also comprise an endpoint configuration component 206 that can employ the script wrappers to execute a configuration script at the endpoint device 132. It should be noted that although FIG. 2 depicts the endpoint configuration component 206 as being internal to the orchestration component 202, other variations are possible, wherein the endpoint configuration component 206 can be external to the orchestration component 202.

An alternative to a runlist approach can comprise a hierarchy of wrapper rules, or rules that invoke other rules. Wrapper rules can programmatically include other rules (a capability that does not extend to roles of the entity), and provide the ability to converge rule attributes with attribute values specified by various objects in the system 200 hierarchy. Rule attributes can be exposed to the entities, to enable the entities to perform customizations via the program management component 118. Wrapper rules can work in tandem with configuration discovery plugins to dynamically decide which rules to include for a given endpoint device 132 based on the client endpoint device's configuration. The wrapper rules can also enable customization of enablement or disablement of rules.

A three-step process can be in accordance with wrapper rules. At the first step, software for which a policy exists can be discovered by running discovery and saving the discovered state in the node automatic attributes prior to each compliance enforcement iteration (or, in some embodiments, one or more embodiments, prior to one or more compliance enforcement iterations). For example, "node": {"automatic": {"cc_mysql": {"state":: "installed", "status": "running" "cc_postgresql": {"state": "installed:", "status": "stopped" }}}}. At step 2, based on the combination of the discovered configuration, and a user-configurable (e.g., enable/disable) attribute, a defined policy map attribute for the wrapper rule can specify which rules to execute. For example, a default wrapper rule can comprise the following: ['c_policy_linux_pass_max_age']['policy_map']={"components"=>[{identified_by: 'value', id: 'os:linux', "enforced_by"=>[{policy: 'policy_linux_pass_max_age', enabled: true}]}. At step 3, a pseudo-code can be executed in each of the wrappers (or, in some embodiments, one or more of the wrappers) (e.g., policy_map.each; if software installed and enforcement enabled; policies.each; enforce policy; end; end; end) to provide the benefit of compliance by default, since policies are automatically enforced based on evaluating the state of the client endpoint device 132 against the rules specified in the policy map.

Wrappers can also be used as a facilitator for a dynamic model-driven user interface (UI). Having adopted the use of wrapper rules as a means to enable the dynamic selection of rules to be executed per endpoint device 132, wrappers can be used to convey metadata related to the attributes of compliance rules, which could empower a model-driven UI that can dynamically prepare the UI. This can reduce the time-to-delivery of new compliance policies since the rule developer can prepare the UI by simply providing metadata within the wrapper attributes.

Script wrappers can also be used as a bundling mechanism for release management. Wrappers and compliance rules can be structured as a tree with a single root, multiple branches, and leaves. To facilitate release management, a root wrapper rule can be treated as an overall release number and utilize a cookbook version constraints capability of the system 200 environment objects to manage multiple releases of the root wrapper for an account. For example, one release can be associated with a development environment, another release can be associated with a test environment, and yet another release can be associated with a production environment. However, by having a single root wrapper rule, version dependencies and revisions can be bundled into a single release, which can improve a user experience.

Additionally, the compliance component 104 of the execution component 102 can utilize an additional display component 204. The display component 204 can be used as a reporting dashboard for displaying reports of formatted outputs from the endpoint device 132. The display component 204 can also display scripts and script wrappers that can be executed at the endpoint device 132.

FIG. 3 illustrates yet another block diagram of an example, non-limiting system 300 that facilitates remediation of non-compliant endpoint devices in accordance with one or more embodiments described herein. Repetitive description of like elements employed in other embodiments described herein is omitted for sake of brevity.

FIG. 3 shows an alternative embodiment to systems 100, 200 and in this embodiment, the orchestration component 202 can comprise the process management component 118, and the execution component 102. The infrastructure database 130 can be external to the orchestration component 202. FIG. 3 depicts no direct access from the orchestration component 202 to the endpoint device 132. Therefore, the orchestration component 202 can employ a proxy device 302 (e.g., broker) to communicate with the endpoint device 132. For example, scripts can be based on an open source configuration management tool that has its own server and management data. Consequently, the orchestration component 202 can communicate with the open source configuration management tool (e.g., proxy device 302) to communicate with the endpoint device 132. The orchestration component 202 can read the open source data from the open source configuration management tool and transmit a request to update the endpoint device 132 via the open source configuration management tool. Thus, execution of an update script can then be initiated at the endpoint device 132. The endpoint device 132 can communicate with the open source configuration management tool to ensure the update is made. Additionally, formatted output data can be transmitted from the endpoint device 132 to the open source configuration management tool, which can then be communicated to the compliance database 106.

Figure 4:
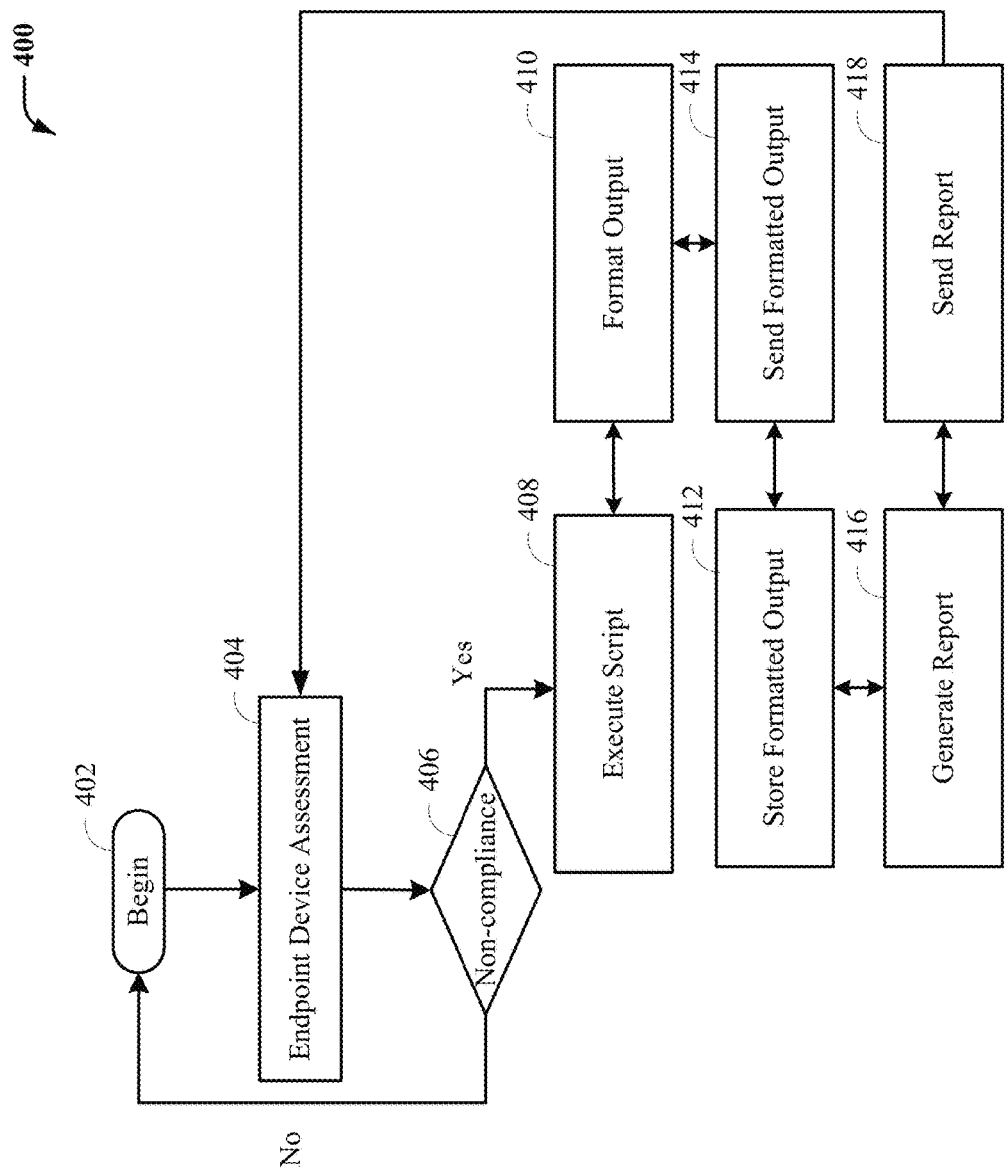
FIG. 4 illustrates a flow diagram of an example, non-limiting block diagram that facilitates remediation of non-compliant endpoint devices in accordance with one or more embodiments described herein.

FIG. 4 illustrates a flow diagram 400 of an example, non-limiting block diagram that facilitates remediation of non-compliant endpoint devices in accordance with one or more embodiments described herein. Repetitive description of like elements employed in other embodiments described herein is omitted for sake of brevity.

The process can begin at block 402. It should be understood that other actions such as endpoint device 132 onboarding, profile generation, environment generation, etc. can be performed either at block 402 or prior to block 402. At block 404, the endpoint device 132 assessment can be performed to determine if the endpoint device 132 is in compliance with rules previously set for the endpoint device. At decision block 406, if the endpoint device 132 is in compliance, then the system 100 can return to the beginning block 402. However, if the endpoint device 132 is non-compliant, then the system 100 can execute a script at block 408. The script can be retrieved from the script database 110 and then executed at the endpoint device 132. Based on the executed script at the endpoint device 132, the endpoint device 132 can format an output associated with the executed script at block 410 and then transmit the formatted output to the compliance database 106 of the execution component 102. The compliance database 106 can store the formatted output at block 412 for use at a later time. The compliance component 104 can then use the stored formatted output to generate report and/or audit data to be sent back to the process management component 118 at block 418. Thereafter, the system 100 can return to a recursive state to identify and remediate non-conforming endpoint devices 132 by proceeding back to the block 404 for the endpoint device 132 assessment.

Figure 5:
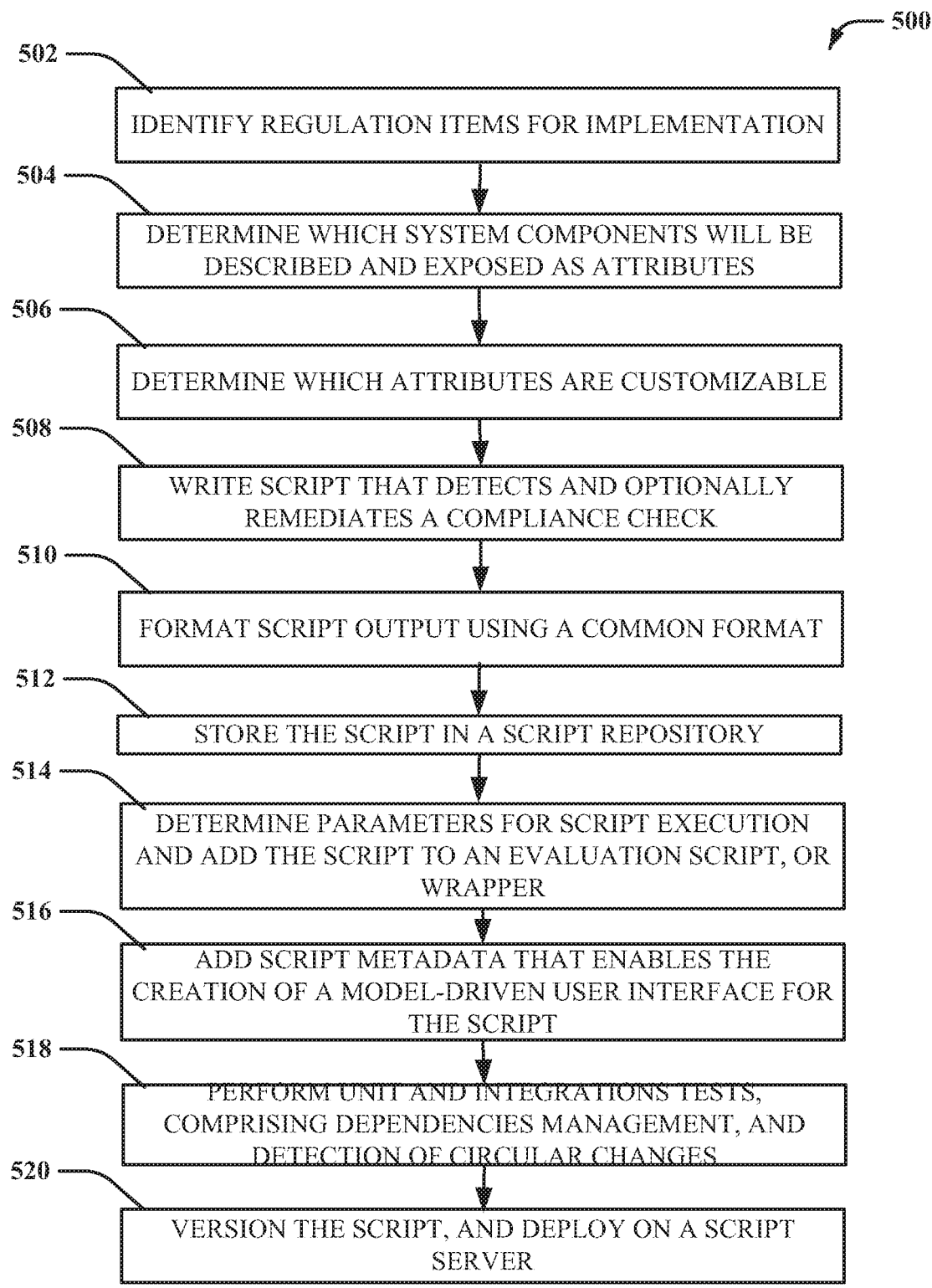
FIG. 5 illustrates a flow diagram of an example, non-limiting computer-implemented method that facilitates policy authoring and distribution in accordance with one or more embodiments described herein.

FIG. 5 illustrates a flow diagram of another example, non-limiting computer-implemented method 500 that facilitates policy authoring and distribution in accordance with one or more embodiments described herein. Repetitive description of like elements employed in other embodiments described herein is omitted for sake of brevity.

At element 504, the method can identify regulation items for implementation (e.g., at the process management component 118). The method can determine which system components will be described and exposed as attributes at element 504 (e.g., at the process management component 118), and determine which attributes are customizable at element 506 (e.g., at the process management component 118). Thereafter, a script can be written at element 508 (e.g., at the process management component 118) that detects and optionally remediates a compliance check. The method can comprise formatting a script output by using a common format at element 510 (e.g., at the endpoint device 132) and storing (e.g., at the compliance database 106) the script output in a repository at element 512. At element 514, the method can comprise determining parameters for script execution and adding the script to an evaluation script, or wrapper. Script metadata can then be added at element 516 (e.g., from the infrastructure database 130) that enables the creation of a model-driven user interface for that script. At element 518, the method can perform unit and integrations tests, comprising dependencies management, and detection of circular changes, and version the script and deploy it on a script server at element 520 (e.g., at the script database 110).

Figure 6:
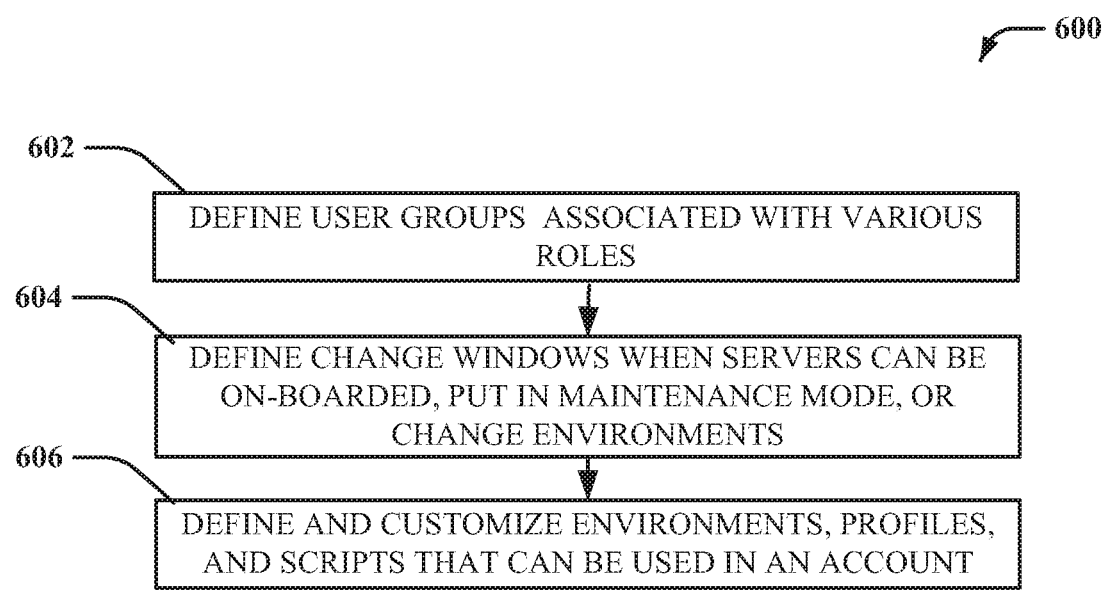
FIG. 6 illustrates a flow diagram of another example, non-limiting computer-implemented method that facilitates entity account management in accordance with one or more embodiments described herein.

FIG. 6 illustrates a flow diagram of another example, non-limiting computer-implemented method 600 that facilitates user account management in accordance with one or more embodiments described herein. Repetitive description of like elements employed in other embodiments described herein is omitted for sake of brevity.

At element 602, the method can define user groups associated with various roles, and define change windows when servers can be on-boarded, put in maintenance mode, or change environments at element 604 (e.g., via the process management component 118). For example, an entity can determine when an endpoint device 132 should be in test mode or maintenance mode. During the maintenance mode, the system 100 can run a script on the endpoint device 132 to determine if the endpoint device 132 is violating any compliance rules. If the endpoint device 132 is violating a compliance rule, then the entity can receive a report stating such and take appropriate action (e.g., removing the endpoint device 132, allowing an exception for the endpoint device 132, changing a status of the endpoint device 132, etc.) The method can also comprise defining and customizing environments, profiles, and scripts that can be used in an account at element 606 (e.g., via the process management component 118). The entity can define scripts to operate at an endpoint device 132 based on data that the entity has received regarding the endpoint device 132 (e.g., status, environment, profile, etc.).

Figure 7:
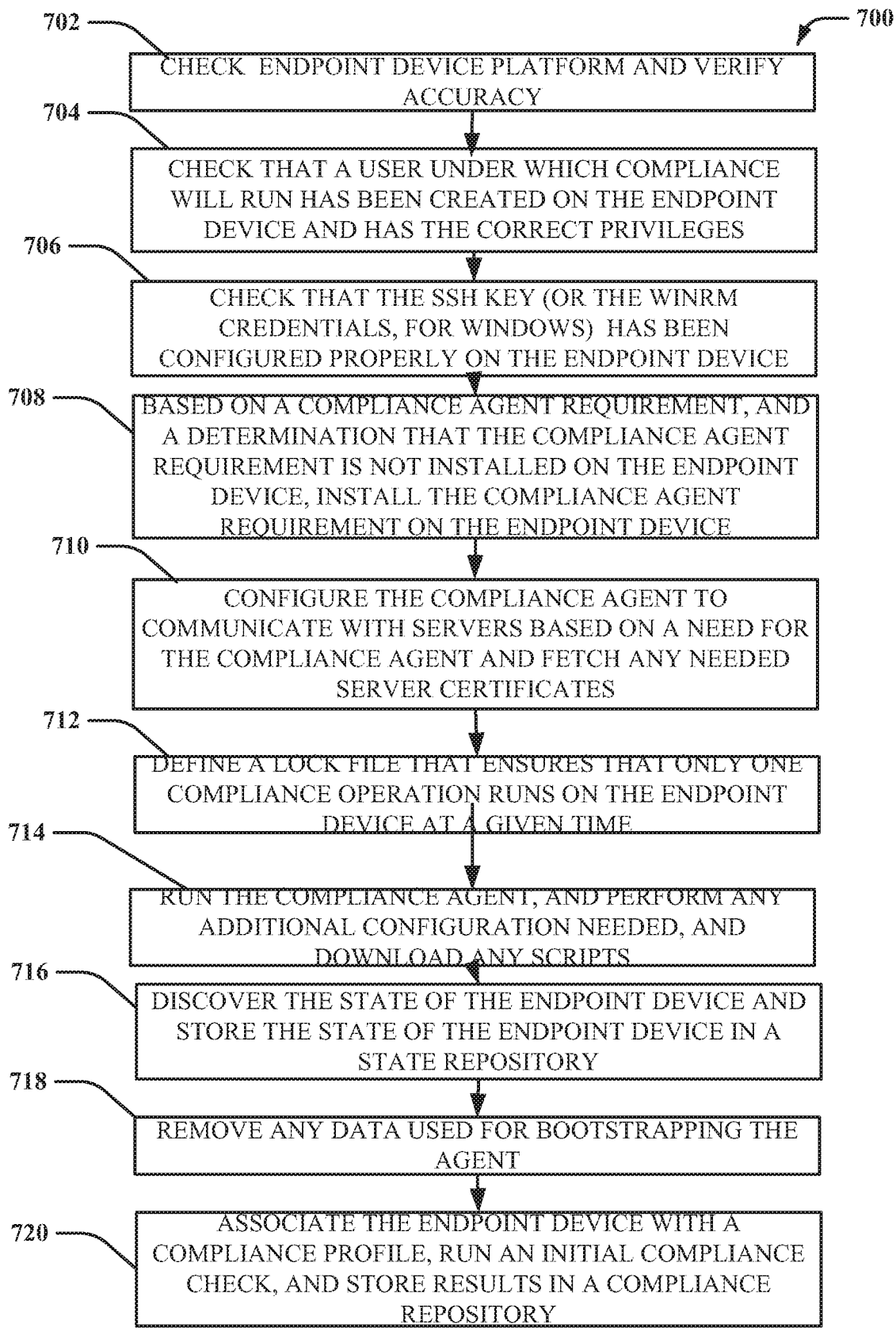
FIG. 7 illustrates a flow diagram of another example, non-limiting computer-implemented method that facilitates endpoint device onboarding in accordance with one or more embodiments described herein.

FIG. 7 illustrates a flow diagram of another example, non-limiting computer-implemented method 700 that facilitates endpoint device onboarding in accordance with one or more embodiments described herein. Repetitive description of like elements employed in other embodiments described herein is omitted for sake of brevity.

At element 702, the method can check an endpoint platform and verify accuracy, and check that an entity under which compliance will run has been created on the endpoint device 132, and has the correct privileges at element 704. The method can also check (e.g., via the execution component 102) that a secure shell (SSH) key (or the Windows remote management (WinRM) credentials for Windows) has been configured properly on the endpoint device 132 at element 706. Based on a compliance agent requirement, and a determination that the compliance agent requirement is not installed on the endpoint device 132, the method can install (e.g., via the execution component 102) the compliance agent requirement on the endpoint device 132 at element 708.

Additionally, the method can configure the compliance agent to communicate with servers based on need for the compliance agent and fetch any needed server certificates at element 710. At element 712, the method can comprise defining (e.g., via the process management component 118) a lock file that ensures that only one compliance operation runs on the endpoint device 132 at a given time, and the method can comprise running the compliance agent (e.g., via the compliance component 104), performing any additional configuration needed, and downloading any scripts at element 714. The method can also determine the state of the endpoint device and store it in a state repository at element 716, remove any data used for bootstrapping the agent at element 718, associate the endpoint device with a compliance profile, run an initial compliance check, and store results in a compliance repository at element 720 (e.g., via the compliance component 104).

Figure 8:
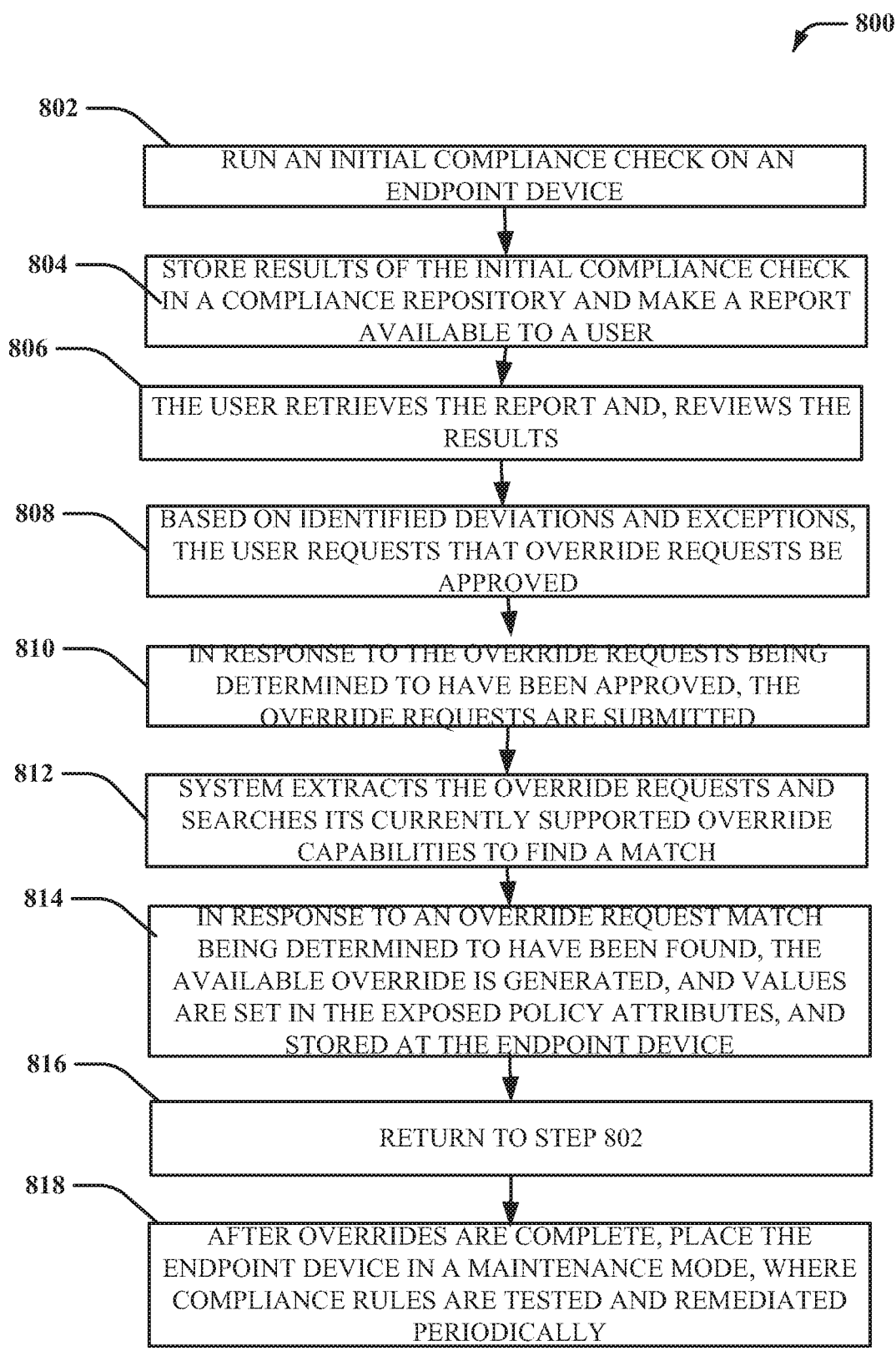
FIG. 8 illustrates a flow diagram of another example, non-limiting computer-implemented method that facilitates endpoint device onboarding in accordance with one or more embodiments described herein.

FIG. 8 illustrates a flow diagram of another example, non-limiting computer-implemented method 800 that facilitates endpoint device onboarding in accordance with one or more embodiments described herein. Repetitive description of like elements employed in other embodiments described herein is omitted for sake of brevity.

The method can run an initial compliance check on an endpoint device 132 at element 802, and store results of the initial compliance check in a compliance repository (e.g., the compliance database 106) and make a report available (e.g., via the process management component 118) to an entity at element 804. The entity can retrieve the report and review the results at element 806. Based on identified (e.g., via the display component 120) deviations and exceptions, the entity can request (e.g., via the process management component 118) that override requests be approved at element 808. In response to the override requests being determined to have been approved, the override requests can be submitted at element 810. At element 812, the system 100 can extract the override requests and search (e.g., via the rule database 124) its currently supported override capabilities to find a match. In response to an override request match being determined to have been found, the method can generate an available override at element 814, and values can be set in the exposed policy attributes, and stored at the endpoint device 132. Thereafter, the method can return to element 802 and re-run the process at element 816. At element 818, after the overrides are complete, the method can place the endpoint device 132 in maintenance mode, where compliance rules can be tested and remediated periodically.

Figure 9:
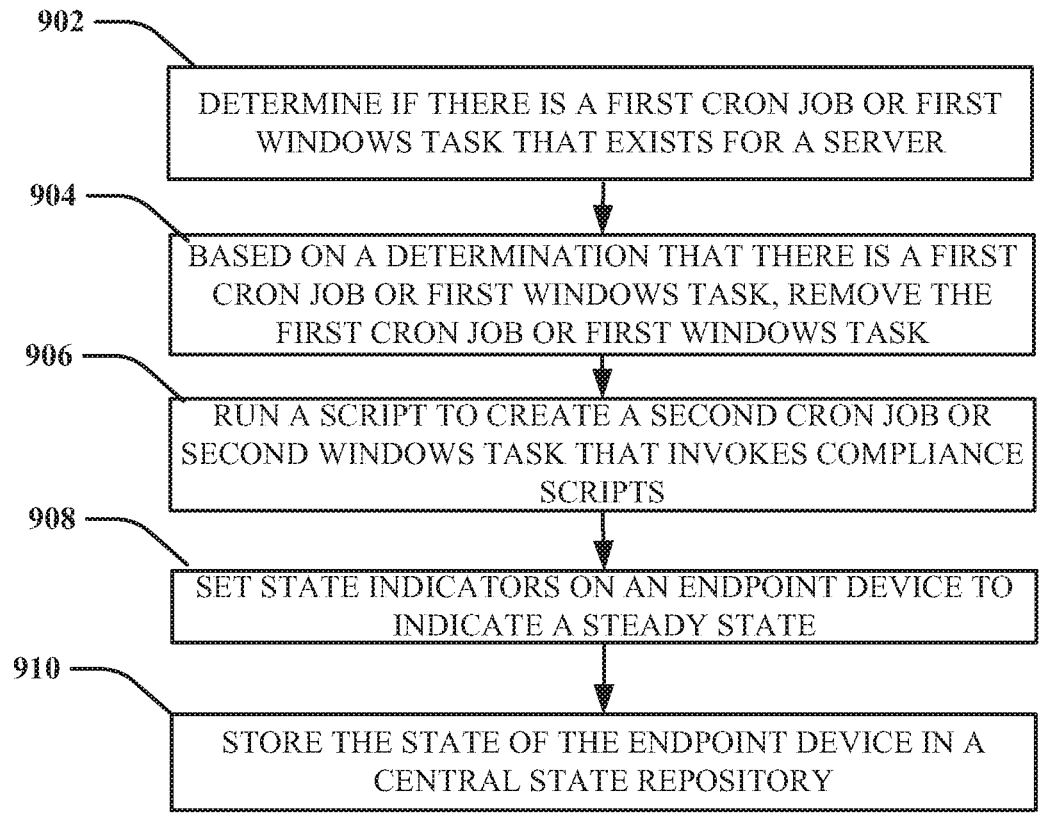
FIG. 9 illustrates a flow diagram of another example, non-limiting computer-implemented method that facilitates steady state operation for an endpoint device in accordance with one or more embodiments described herein.

FIG. 9 illustrates a flow diagram of another example, non-limiting computer-implemented method 900 that facilitates steady state operation for an endpoint device in accordance with one or more embodiments described herein. Repetitive description of like elements employed in other embodiments described herein is omitted for sake of brevity.

At element 902, the method can determine if there is a first time-based job scheduler (e.g., cron job) or first windows task that exists for a server. Based on a determination that there is a first cron job or first windows task, the method can remove the first cron job or first windows task at element 904. The method can run a script to create a second cron job or second windows task that invokes compliance scripts at element 906. At element 908, the method can set state indicators on an endpoint device 132 to indicate a steady state, and the method can store the state of the endpoint device in a central state repository at element 910.

Figure 10:
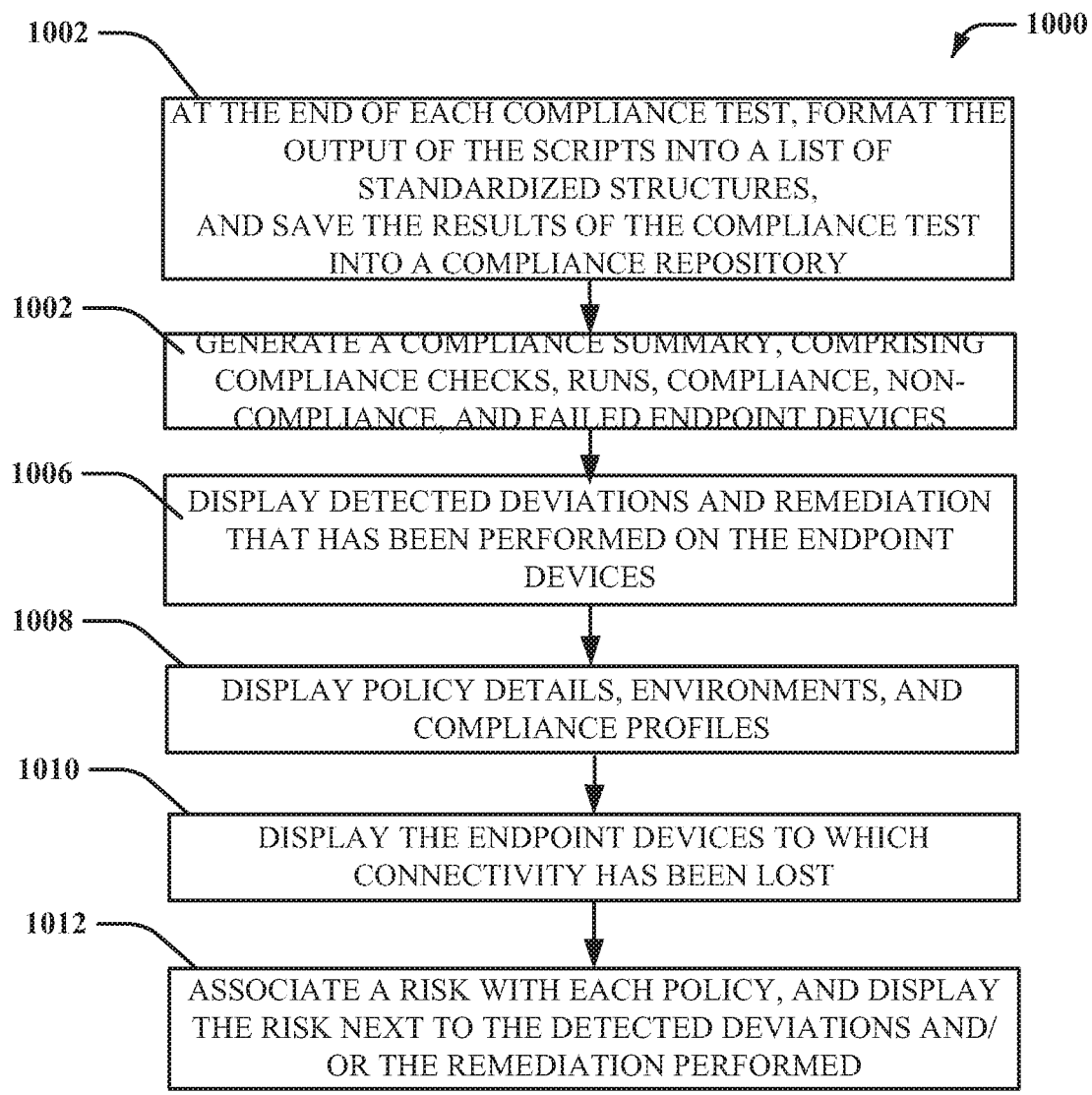
FIG. 10 illustrates a flow diagram of another example, non-limiting computer-implemented method that facilitates reports, analytics, and audits in accordance with one or more embodiments described herein.

FIG. 10 illustrates a flow diagram of another example, non-limiting computer-implemented method 1000 that facilitates reports, analytics, and audits in accordance with one or more embodiments described herein. Repetitive description of like elements employed in other embodiments described herein is omitted for sake of brevity.

At the end of each compliance test (or, in some embodiments, one or more compliance tests), the method can format (e.g., via the endpoint device 132) the output of the scripts into a list of standardized structures, and save the results of the compliance test into a compliance repository (e.g., compliance database 106) at element 1002. The method can generate (e.g., via the compliance component 104) a compliance summary, comprising compliance checks, runs, compliance, non-compliance, and failed endpoint devices at element 1004. At element 1006, the method can display (e.g., via the display component 120) detected deviations and remediation that has been performed on the endpoint devices 132, and at element 1008, the method can display (e.g., via the display component 120) policy details, environments, and compliance profiles. Furthermore, the method can display (e.g., via the display component 120) the endpoint devices to which connectivity has been lost at element 1010, associate (e.g., via the process management component 118) a risk with each policy, and display (e.g., via the display component 120) the risk next to the detected deviations and/or the remediation performed at element 1012.

Figure 11:
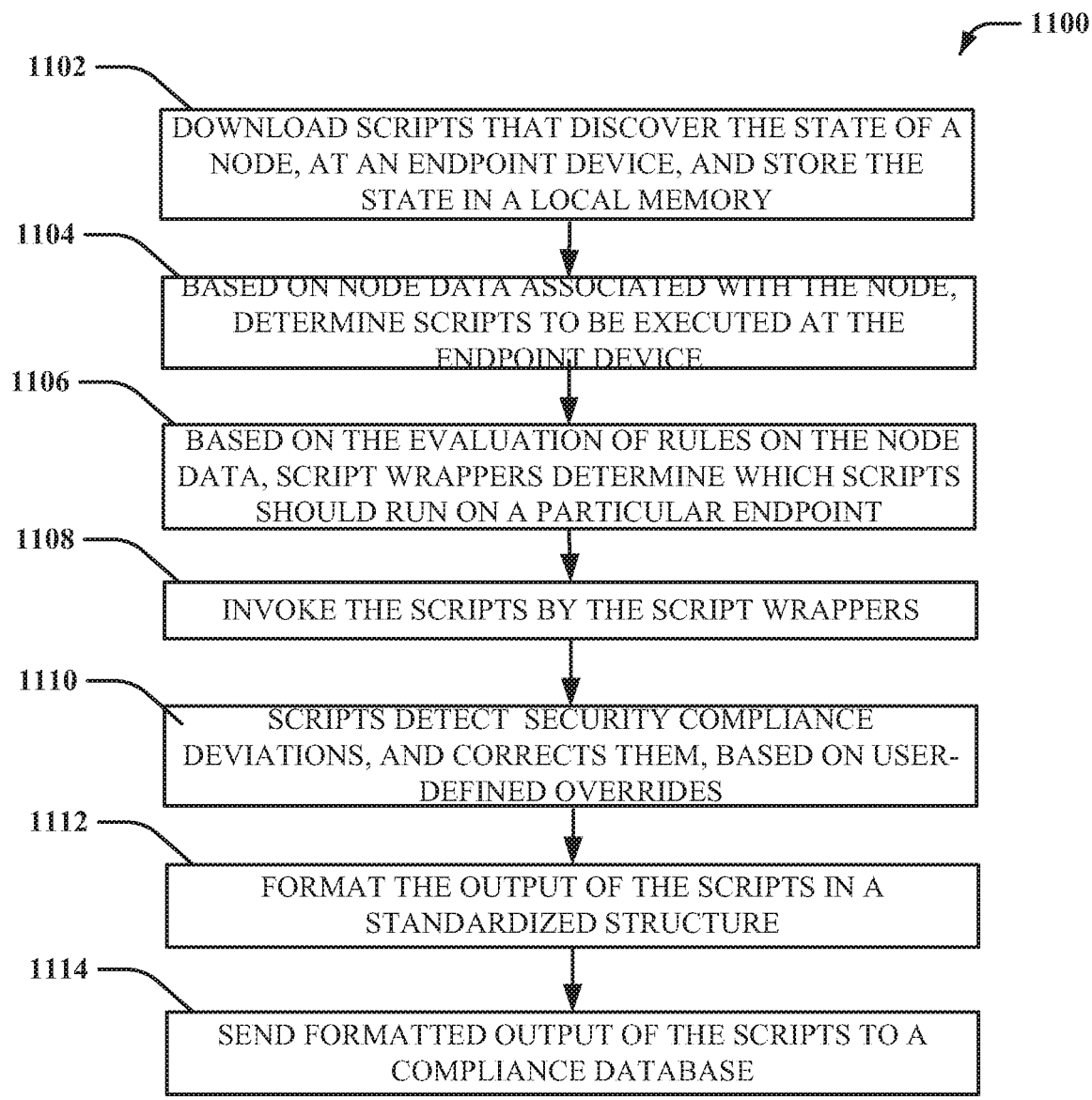
FIG. 11 illustrates a flow diagram of another example, non-limiting computer-implemented method that facilitates steady state operation for an endpoint device in accordance with one or more embodiments described herein.

FIG. 11 illustrates a flow diagram of another example, non-limiting computer-implemented method 1100 that facilitates steady state operation for endpoint devices in accordance with one or more embodiments described herein. Repetitive description of like elements employed in other embodiments described herein is omitted for sake of brevity.

The method can comprise downloading scripts that discover the state of a node, at an endpoint device 132, and storing the state in a local memory at element 1102. Based on node data associated with the node, the method can determine scripts (e.g., via the process management component 118) to be executed at the endpoint device 132 at element 1104. Based on the evaluation of rules on the node data, the method can facilitate script wrappers determining (e.g., via the execution component 102) which scripts should run on a particular endpoint device 132 at element 1106. The method can invoke (e.g., via the execution component 102) the scripts by the script wrappers at element 1108, and the scripts can detect security compliance deviations, and correct the security compliance deviations based on user-defined overrides at element 1110. Additionally, the method can format the output of the scripts in a standardized structure at element 1112, and transmit the formatted output of the scripts to a compliance database 106 at element 1114.

Figure 12:
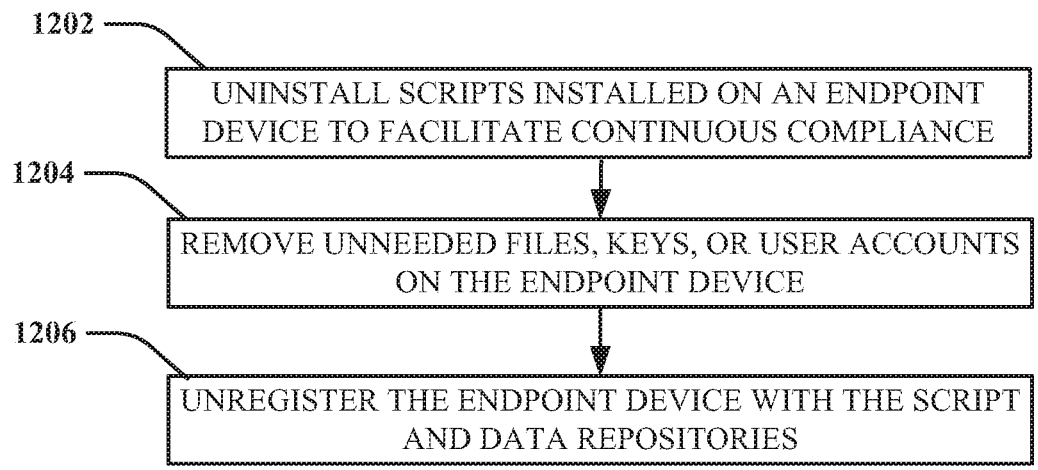
FIG. 12 illustrates a flow diagram of another example, non-limiting computer-implemented method that facilitates decommissioning of endpoint devices in accordance with one or more embodiments described herein.

FIG. 12 illustrates a flow diagram of another example, non-limiting computer-implemented method that facilitates decommissioning of an endpoint devices in accordance with one or more embodiments described herein. Repetitive description of like elements employed in other embodiments described herein is omitted for sake of brevity.

At element 1202, the method can uninstall (e.g., via the execution component 102) scripts installed on an endpoint device to facilitate continuous compliance, and remove (e.g., via the execution component 102) unneeded files, keys, or user accounts on the endpoint device at element 1204. During the uninstall operation of an endpoint device 132, credentials of the endpoint device 132 can be removed from the script database 110. Any configuration information about the endpoint device 132 can also be removed from the script database 110. Thereafter, the method can unregister (e.g., via the execution component 102) the endpoint device 132 with the script and data repositories at element 1206. Additionally, security keys used to connect to the endpoint device 132 can be removed from the execution component 102, and the state of the endpoint device 132 can be marked as "offboarded" in the infrastructure database 130.

Figure 13:
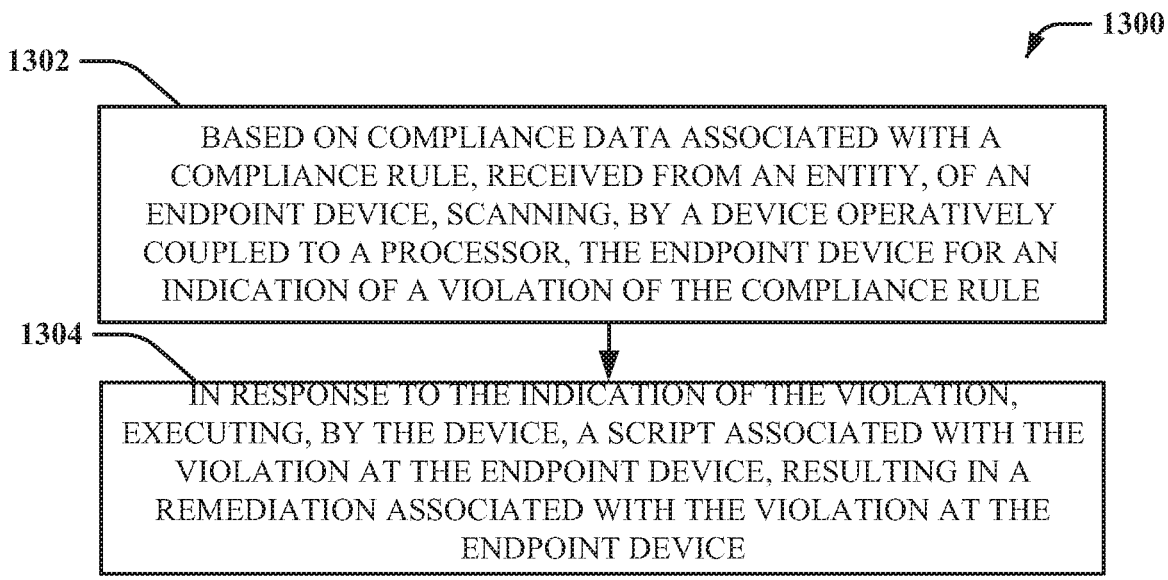
FIG. 13 illustrates a flow diagram of another example, non-limiting computer-implemented method facilitates testing and remediation for endpoint devices in accordance with one or more embodiments described herein.

FIG. 13 illustrates a flow diagram of another example, non-limiting computer-implemented method 1300 facilitates testing and remediation for endpoint devices in accordance with one or more embodiments described herein. Repetitive description of like elements employed in other embodiments described herein is omitted for sake of brevity.

Based on compliance data associated with a compliance rule, received from an entity, of an endpoint device, the method can comprise scanning (e.g., via the execution component 102), by a device operatively coupled to a processor, the endpoint device 132 for an indication of a violation of the compliance rule at element 1302. The scanning can occur as a part of a script being executed at the endpoint device 132 or prior to a script being executed at the endpoint device. Data associated with the scanning can be provided to the entity to allow the entity to generate rules and/or exception to rules for the endpoint device.

In response to the indication of the violation, the method can comprise executing (e.g., via the execution component 102), by the device, a script (e.g., from the script database 110) associated with the violation at the endpoint device 132, resulting in a remediation associated with the violation at the endpoint device 132 at element 1304. In turn, after the remediation has occurred, an output from the endpoint device can be formatted and provided with a value prior to the output being sent to a compliance database 106 of the execution component 102. The value can be used to associate or flag the script with the violation and/or the exception so that the same script can be used to mitigate the same or similar violation in the future for the endpoint device 132 and/or other endpoint devices.

Figure 14:
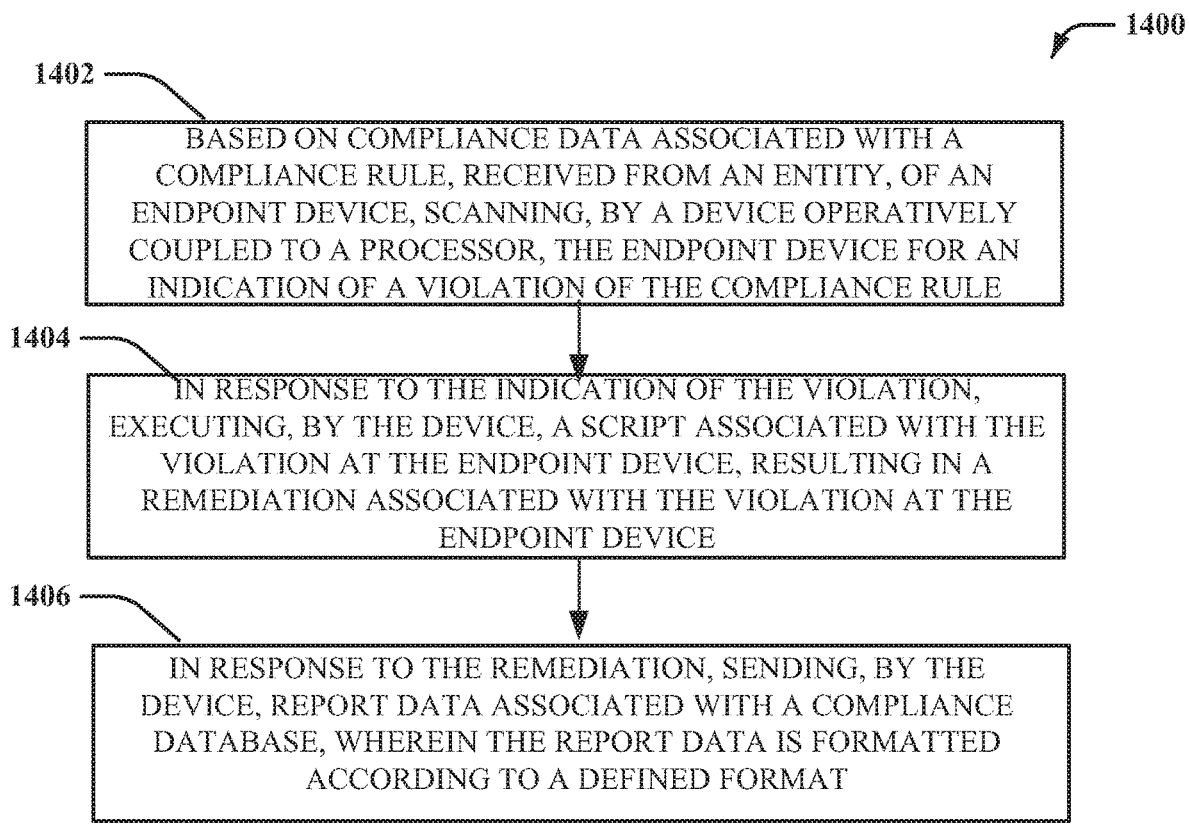
FIG. 14 illustrates a flow diagram of an example, non-limiting computer-implemented method facilitates testing and remediation for endpoint devices in accordance with one or more embodiments described herein.

FIG. 14 illustrates a flow diagram of an example, non-limiting computer-implemented method 1400 facilitates testing and remediation for endpoint devices in accordance with one or more embodiments described herein. Repetitive description of like elements employed in other embodiments described herein is omitted for sake of brevity.

Based on compliance data associated with a compliance rule, received from an entity, of an endpoint device 132, the method can comprise scanning (e.g., via the execution component 102), by a device operatively coupled to a processor, the endpoint device 132 for an indication of a violation of the compliance rule at element 1402. The scanning can occur as a part of a script being executed at the endpoint device 132 or prior to a script being executed at the endpoint device. Data associated with the scanning can be provided to the entity to allow the entity to generate rules and/or exception to rules for the endpoint device.

In response to the indication of the violation, the method can comprise executing (e.g., via the execution component 102), by the device, a script (e.g., from the script database 110) associated with the violation at the endpoint device 132, resulting in a remediation associated with the violation at the endpoint device 132 at element 1404. Additionally, in response to the remediation, the method can comprise transmitting (e.g., via the endpoint device 132), by the device, report data associated with a compliance database 106, wherein the report data is formatted according to a defined format. The report data can be formatted and provided with a value prior to the output being sent to a compliance database 106 of the execution component 102. The value can be used to associate or flag the script with the violation and/or the exception so that the same script can be used to mitigate the same or similar violation in the future for the endpoint device 132 and/or other endpoint devices.

Figure 15:
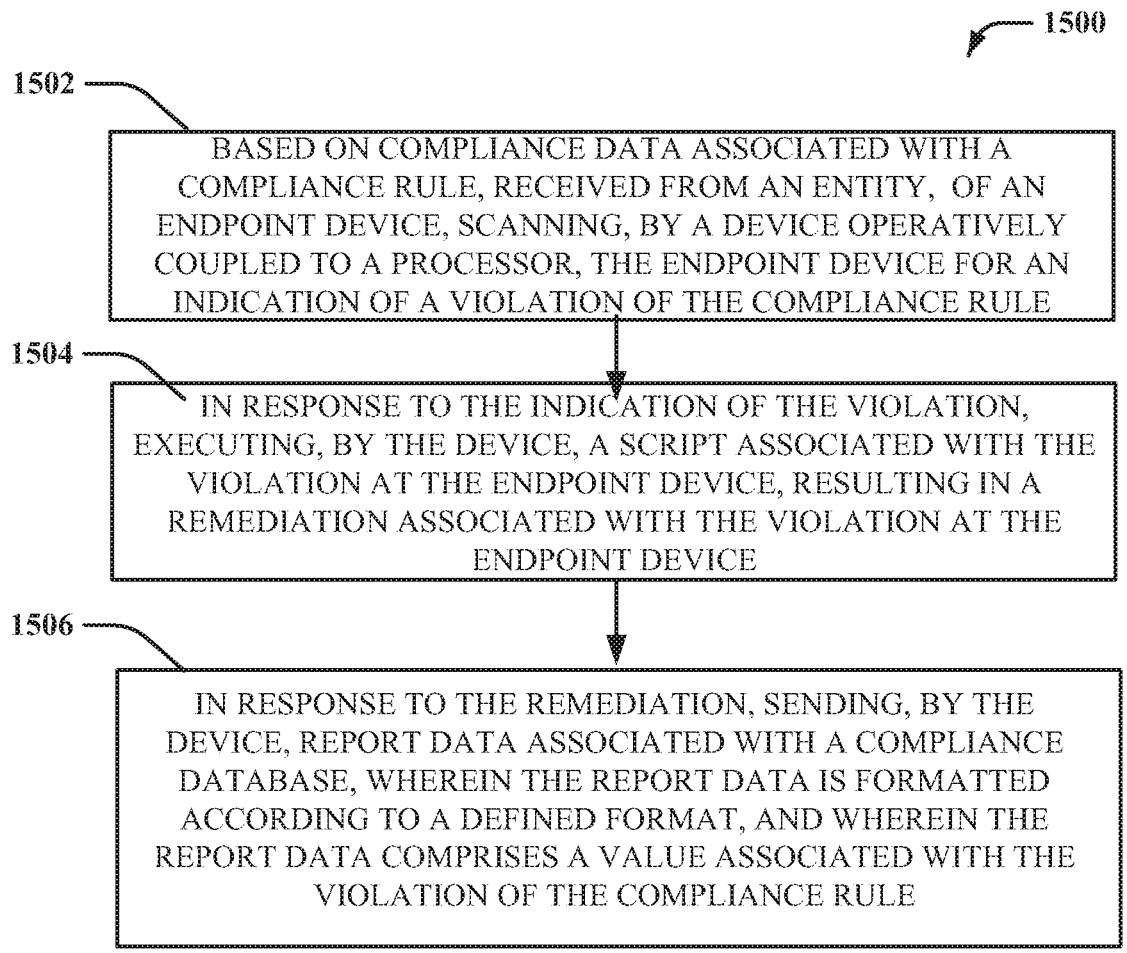
FIG. 15 illustrates a flow diagram of another example, non-limiting computer-implemented method that facilitates testing and remediation for endpoint devices in accordance with one or more embodiments described herein.

FIG. 15 illustrates a flow diagram of another example, non-limiting computer-implemented method 1500 that facilitates testing and remediation for endpoint devices in accordance with one or more embodiments described herein. Repetitive description of like elements employed in other embodiments described herein is omitted for sake of brevity.

Based on compliance data associated with a compliance rule, received from an entity, of an endpoint device 132, the method can comprise scanning (e.g., via the execution component 102), by a device operatively coupled to a processor, the endpoint device 132 for an indication of a violation of the compliance rule at element 1502. The scanning can occur as a part of a script being executed at the endpoint device 132 or prior to a script being executed at the endpoint device. Data associated with the scanning can be provided to the entity to allow the entity to generate rules and/or exception to rules for the endpoint device.

In response to the indication of the violation, the method can comprise executing (e.g., via the execution component 102), by the device, a script (e.g., from the script database 110) associated with the violation at the endpoint device 132, resulting in a remediation associated with the violation at the endpoint device 132 at element 1504. Furthermore, in response to the remediation, transmitting (e.g., from the endpoint device 132), by the device, report data associated with a compliance database 106, wherein the report data is formatted according to a defined format, and wherein the report data comprises a value associated with the violation of the compliance rule at element 1506. The value can be used to associate or flag the script with the violation and/or the exception so that the same script can be used to mitigate the same or similar violation in the future for the endpoint device 132 and/or other endpoint devices.

Figure 16:
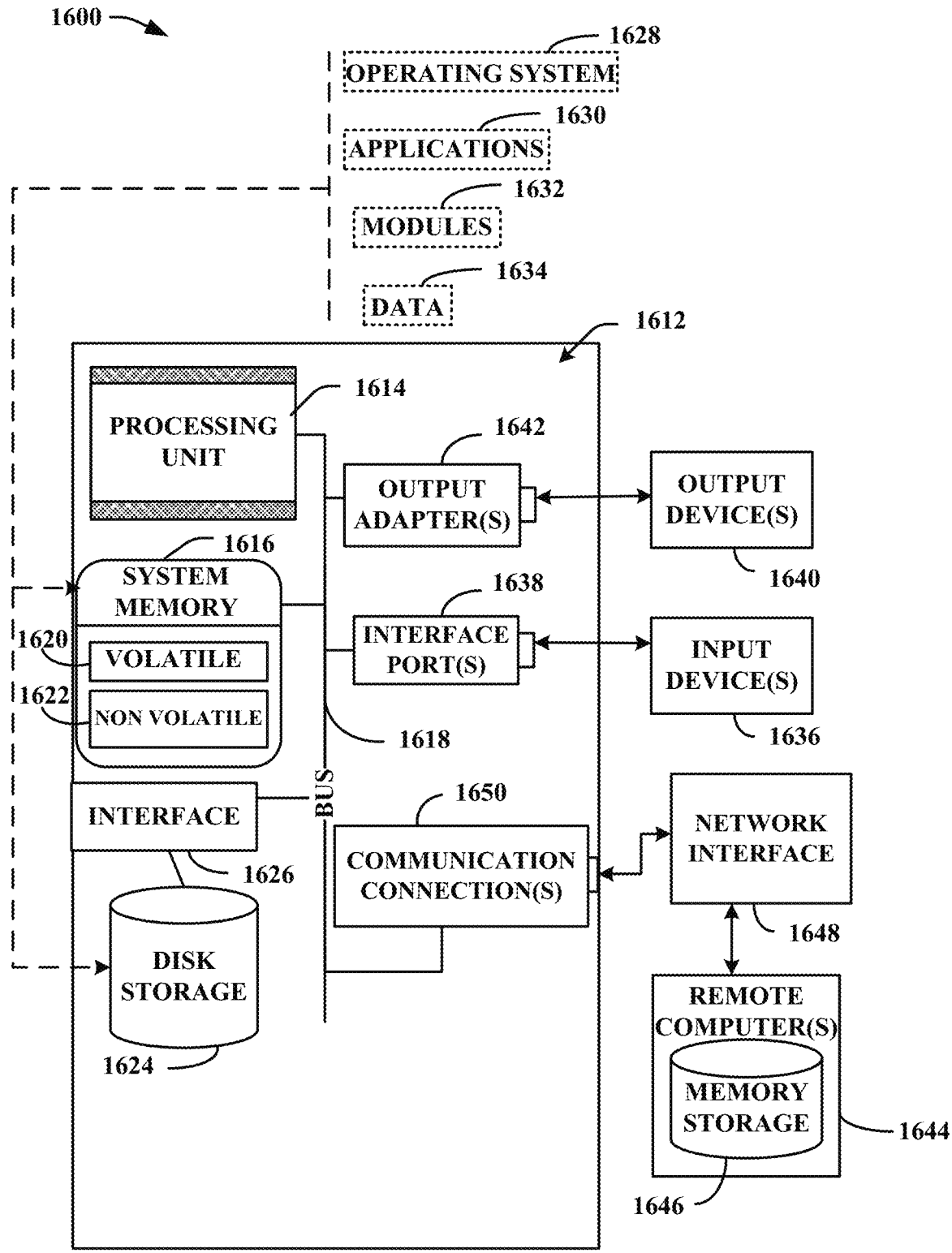
FIG. 16 illustrates a block diagram of an example, non-limiting operating environment in which one or more embodiments described herein can be facilitated.

In order to provide a context for the various aspects of the disclosed subject matter, FIG. 16 as well as the following discussion is intended to provide a general description of a suitable environment in which the various aspects of the disclosed subject matter can be implemented. FIG. 16 illustrates a block diagram of an example, non-limiting operating environment in which one or more embodiments described herein can be facilitated. With reference to FIG. 16, a suitable operating environment 1600 for implementing various aspects of this disclosure can also include a computer 1612. The computer 1612 can also include a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614. The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1616 can also include volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1620 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1612 can also include removable/non-removable, volatile/non-volatile computer storage media. FIG. 16 illustrates, for example, a disk storage 1624. Disk storage 1624 can also include, but is not limited to, devices like a magnetic disk drive, floppy disk drive, tape drive, Jaz drive, Zip drive, LS-160 drive, flash memory card, or memory stick. The disk storage 1624 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used, such as interface 1626. FIG. 16 also depicts software that acts as an intermediary between users and the basic computer resources described in the suitable operating environment 1600. Such software can also include, for example, an operating system 1628. Operating system 1628, which can be stored on disk storage 1624, acts to control and allocate resources of the computer 1612.

System applications 1630 take advantage of the management of resources by operating system 1628 through program modules 1632 and program data 1634, e.g., stored either in system memory 1616 or on disk storage 1624. It is to be appreciated that this disclosure can be implemented with various operating systems or combinations of operating systems. An entity enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port can be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a computer, a server, a router, a network PC, a workstation, a microprocessor based appliance, a peer device or other common network node and the like, and typically can also include many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1650 refers to the hardware/software employed to connect the network interface 1648 to the system bus 1618. While communication connection 1650 is shown for illustrative clarity inside computer 1612, it can also be external to computer 1612. The hardware/software for connection to the network interface 1648 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely or partly on a computer for an entity, as a stand-alone software package, and/or partly on a remote computer or entirely on the remote computer or server. In the latter scenario, the remote computer can be connected to the entity computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
an execution component that:
determines a policy that applies to an endpoint device based on an operating environment associated with the endpoint device and a profile, wherein the profile comprises a defined set of behaviors and attribute values that can be input into scripts;
based on compliance data, received from an entity, associated with a compliance rule of the endpoint device, scans the endpoint device for an indication of a violation of the compliance rule associated with the policy;
in response to the indication of the endpoint device being non-compliant and thereby exhibiting the violation, facilitates execution of a script associated with the violation at the endpoint device, resulting in a remediation associated with the violation at the endpoint device; and
determines and facilitates display of data regarding which parameter is non-compliant, a value associated with the non-compliant parameter, and what value the parameter should be set to for the endpoint device to become compliant; and
a process manager component that:
receives, from the endpoint device, a non-compliance exception request based on a determination that the endpoint device is non-compliant;
accesses a rule database to determine when a previous non-compliance exception request has been granted for the policy;
in response to a determination that the previous non-compliance exception request has been granted, generates an available override and one or more values to set for attributes of the policy, and stores the one or more values in the endpoint device; and
in response to a determination that the previous non-compliance exception request has not been granted, removes the endpoint device from a system with which the endpoint device is associated.

2. The system of claim 1, wherein the computer executable components further comprise:
a compliance component that transmits report data associated with a remediation compliance database in response to the remediation, wherein the report data is formatted according to a defined format.

3. The system of claim 2, wherein the report data comprises a value associated with the violation of the compliance rule and the operating environment is one of a test environment, a production environment, or a development environment.

4. The system of claim 1, wherein the process manager component:
communicates, to the endpoint device, the determination regarding whether to grant the non-compliance exception request or to not grant the non-compliance exception request.

5. The system of claim 4, wherein the process manager component also accesses the rule database to determine if a second endpoint device has been granted a non-compliance exception request for the policy.

6. The system of claim 1, wherein the indication is a first indication, and wherein the execution component receives a second indication associated with a current state of the endpoint device.

7. The system of claim 6, wherein the second indication comprises non-compliance data representative of the endpoint device being determined to be non-compliant with the compliance rule.

8. The system of claim 1, wherein the compliance data is first compliance data, and wherein the execution component transmits second compliance data comprising a command for prompting the endpoint device to be compliant with the compliance rule of an entity device.

9. The system of claim 1, wherein the process manager component also accesses the rule database to determine if a second endpoint device has been granted a non-compliance exception request for the policy.

10. The system of claim 1, wherein the process manager component also accesses the rule database to determine if the endpoint device has any other pending or approved exception requests, wherein the previous non-compliance exception request was received prior to the non-compliance exception request.

11. A computer program product that facilitates compliance control remediation, the computer program product comprising a computer readable storage medium having program instructions embodied therewith, the program instructions executable by a processor to cause the processor to:
determine, by the processor, a policy that applies to an endpoint device based on an operating environment associated with the endpoint device and a profile, wherein the profile comprises a defined set of behaviors and attribute values that can be input into scripts;
based on compliance data, received from an entity and associated with a compliance rule of the endpoint device, scan, by the processor, the endpoint device for an indication of a violation of the compliance rule associated with the policy;
in response to the indication of the endpoint device being non-compliant and thereby exhibiting the violation, execute, by the processor, a script associated with the violation at the endpoint device, resulting in a remediation associated with the violation at the endpoint device;
based on a security failure resulting in a violation indicating the non-compliance with the policy, receive, by the processor, a non-compliance exception request requesting an exception to the policy;
access, by the processor, a rule database to determine when a previous non-compliance exception request has been granted for the policy;
in response to a determination that the previous non-compliance exception request has been granted, generate, by the processor, an available override and one or more values to set for attributes of the policy, and store, by the processor, the one or more values in the endpoint device; and in response to a determination that the previous non-compliance exception request has not been granted, remove, by the processor, the endpoint device from a system with which the endpoint device is associated.

12. The computer program product of claim 11, wherein the program instructions are further executable by the processor to cause the processor to:

in response to the remediation, transmit, by the processor, report data associated with a remediation compliance database, wherein the report data is formatted according to a defined format.

13. The computer program product of claim 12, wherein the report data comprises a value associated with the violation of the compliance rule and the operating environment is one of a test environment, a production environment, or a development environment.

14. The computer program product of claim 11, wherein the indication is a first indication, and wherein the program instructions are further executable by the processor to cause the processor to:

receive, by the processor, a second indication associated with a current state of the endpoint device.

15. The computer program product of claim 14, wherein the second indication comprises non-compliance data representative of the endpoint device being determined to be non-compliant with the compliance rule.

16. The computer program product of claim 11, wherein the compliance data is first compliance data, and wherein the program instructions are further executable by the processor to cause the processor to:

in response to the remediation, transmit to an entity device, by the processor, second compliance data comprising a command for prompting the endpoint device to be compliant with the compliance rule.

17. A computer program product that facilitates compliance control remediation, the computer program product comprising a computer readable storage medium having program instructions embodied therewith, the program instructions executable by a processor to cause the processor to:

employ, by the processor, one or more wrapper rules to determine which one or more compliance rules to execute for an endpoint device based on a client endpoint device configuration, wherein the employing the one or more wrapper rules comprises comprising:

based on the discovered configuration and a user configurable attribute, specifying which of one or more compliance rules to execute via a defined policy map attribute for the one or more wrapper rules and executing a condition in one or more of the wrappers to provide the benefit of compliance by default;

based on compliance data, received from an entity, associated with a compliance rule of the one or more compliance rules of an endpoint device, scan, by the processor, the endpoint device for an indication of a violation of the compliance rule;

in response to the indication of the endpoint device being non-compliant and thereby exhibiting the violation, facilitate, by the processor, execution of a script associated with the violation at the endpoint device, resulting in a remediation associated with the violation at the endpoint device;

receive, by the processor, an exception request from the endpoint device, wherein the exception request is related to an exception to the compliance rule;

determine, by the processor, whether to uninstall the script associated with the violation at the endpoint device to facilitate continuous compliance;

determine, by the processor, whether to remove a user account on the endpoint device based on discovery of the indication of the endpoint device being non-compliant; and determine, by the processor, whether to remove the endpoint device from a system with which the endpoint device is associated based on discovery of the indication of the endpoint device being non-compliant.

18. The computer program product of claim 17, wherein the program instructions are further executable by the processor to cause the processor to:

in response to receiving the exception request from the endpoint device, approve, by the processor, the exception to the compliance rule for the endpoint device.

19. The computer program product of claim 17, wherein the employing one or more wrapper rules further comprises:

discovering software for which a policy exists by executing discovery and saving the discovered state prior to compliance rule enforcement.

* * * * *